United States Patent
Takamoto

(10) Patent No.: US 7,809,977 B2
(45) Date of Patent: Oct. 5, 2010

(54) I/O DEVICE SWITCHING METHOD

(75) Inventor: Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 448 days.

(21) Appl. No.: 11/902,364

(22) Filed: Sep. 20, 2007

(65) Prior Publication Data
US 2008/0313362 A1    Dec. 18, 2008

(30) Foreign Application Priority Data
Jun. 13, 2007  (JP) .............................. 2007-156339

(51) Int. Cl.
*G06F 11/00* (2006.01)
(52) U.S. Cl. ................. 714/5; 714/43; 714/44
(58) Field of Classification Search ...... 714/5, 714/43, 44
See application file for complete search history.

(56) References Cited

U.S. PATENT DOCUMENTS

| | | | |
|---|---|---|---|
| 5,313,584 A * | 5/1994 | Tickner et al. .............. 710/37 |
| 7,502,955 B2 * | 3/2009 | Ishikawa et al. ............... 714/6 |
| 2005/0267963 A1 | 12/2005 | Baba et al. |
| 2006/0117216 A1 * | 6/2006 | Ikeuchi et al. ............... 714/6 |
| 2006/0224826 A1 * | 10/2006 | Arai et al. .................. 711/114 |
| 2006/0248382 A1 * | 11/2006 | Fujibayashi .................. 714/6 |
| 2007/0067666 A1 * | 3/2007 | Ishikawa et al. ............... 714/6 |
| 2007/0174676 A1 * | 7/2007 | Tanaka et al. ................. 714/6 |

FOREIGN PATENT DOCUMENTS

JP    2005-301488    10/2005

* cited by examiner

*Primary Examiner*—Joshua A Lohn
(74) *Attorney, Agent, or Firm*—McDermott Will & Emery LLP

(57) ABSTRACT

An I/O device management table that manages the types of I/O devices connected to an I/O switch is provided, and one or plural unallocated I/O devices are defined and registered as standby I/O devices. When a failure occurs in any of I/O devices, the I/O device management table is used to select an I/O device of the same type as the failed I/O device from the standby I/O devices, and the selected I/O device is allocated to a computer to which the failed I/O device is connected. I/O device management can be eased at failure in a computer including an I/O switch device.

10 Claims, 23 Drawing Sheets

| I/O SWITCH IDENTIFIER | PORT NUMBER | CONNECTION DEVICE | DEVICE IDENTIFIER | STATE |
|---|---|---|---|---|
| SW1 | 0 | NIC | MAC1 | NORMAL |
| | 1 | HBA | WWN1 | NORMAL |
| | 2 | NIC | MAC2 | NORMAL |
| | 3 | HBA | WWN2 | NORMAL |
| | 4 | HOST | HOST1 | NORMAL |
| | 5 | HOST | HOST2 | NORMAL |
| | 6 | HOST | HOST3 | NORMAL |
| | 7 | HOST | HOST4 | NORMAL |
| SW2 | 0 | NIC | MAC3 | NORMAL |
| | 1 | HBA | WWN3 | NORMAL |
| | 2 | NIC | MAC4 | NORMAL |
| | 3 | HBA | WWN4 | NORMAL |
| | 4 | HOST | HOST5 | NORMAL |
| | 5 | HOST | HOST6 | NORMAL |
| | 6 | HOST | HOST7 | NORMAL |
| | 7 | HOST | HOST8 | NORMAL |

| 1001 | 1002 | 1003 | 1004 | 1005 | 1006 | 1007 |
|---|---|---|---|---|---|---|
| SERVER DEVICE IDENTIFIER | PROCESSOR CONFIGURATION | MEMORY CAPACITY | SERVER CONNECTION I/O PORT | SERVER ALLOCATION I/O PORT | SERVER ALLOCATION DEVICE | ALLOCATION DISK |
| HOST1 | PROCESSOR 1 2GHz×2 | 4GB | SW1 PORT3 | PORT0 | NIC | – |
| | | | | PORT1 | HBA | LU0 |
| | | | SW2 PORT3 | PORT0 | NIC | – |
| | | | | PORT1 | HBA | LU1 |
| HOST2 | PROCESSOR 1 1GHz | 2GB | SW1 PORT4 | PORT2 | NIC | – |
| | | | | PORT3 | HBA | LU2 |
| HOST3 | PROCESSOR 1 1GHz | 2GB | SW2 PORT4 | PORT2 | NIC | – |
| | | | | PORT3 | HBA | LU3 |
| HOST4 | PROCESSOR 1 2GHz×2 | 4GB | UNALLOCATED | UNALLOCATED | – | – |

| 1101 | 1102 | 1103 | | 1104 |
|---|---|---|---|---|
| SERVER DEVICE IDENTIFIER | SERVER SWITCHED AT SERVER FAILURE | I/O MULTIPLEXED CONNECTION CONFIGURATION | | SERVER STATE |
| HOST1 | HOST4 | NIC/ MAC10 | SW1/PORT0/NIC | NORMAL |
| | | | SW2/PORT0/NIC | |
| | | HBA WWN10 | SW1/PORT1/HBA | |
| | | | SW2/PORT1/HBA | |
| HOST2 | HOST4 | – | | NORMAL |
| HOST3 | HOST4 | – | | NORMAL |
| HOST4 | STANDBY | NOT SET | | NORMAL |

| I/O SWITCH IDENTIFIER (1201) | PORT NO. (1202) | STATE (1203) | DEVICE POOL ALLOCATION (1204) |
|---|---|---|---|
| SW1 | 0 | ALLOCATED | — |
| | 1 | ALLOCATED | — |
| | 2 | ALLOCATED | — |
| | 3 | ALLOCATED | — |
| | 4 | ALLOCATED | — |
| | 5 | ALLOCATED | — |
| | 6 | UNALLOCATED | DEVICE POOL 1 |
| | 7 | UNALLOCATED | |
| SW2 | 0 | ALLOCATED | — |
| | 1 | ALLOCATED | — |
| | 2 | ALLOCATED | — |
| | 3 | ALLOCATED | — |
| | 4 | ALLOCATED | — |
| | 5 | ALLOCATED | — |
| | 6 | UNALLOCATED | DEVICE POOL 2 |
| | 7 | UNALLOCATED | |

| I/O SWITCH IDENTIFIER 1301 | PORT NO. 1302 | TOTAL TRANSFER DATA AMOUNT 1303 | TRAFIC QUANTITY PER UNIT TIME 1304 |
|---|---|---|---|
| SW1 | 0 | 54215 | 15 |
|  | 1 | 5115 | 8 |
|  | 2 | 6854 | 5 |
|  | 3 | 854792 | 24 |
|  | 4 | 1548795 | 256 |
|  | 5 | 25489 | 51 |
|  | 6 | — | — |
|  | 7 | — | — |
| SW2 | 0 | 0 | 0 |
|  | 1 | 0 | 0 |
|  | 2 | 25489 | 25 |
|  | 3 | 57487 | 54 |
|  | 4 | 65878 | 45 |
|  | 5 | 9874266 | 358 |
|  | 6 | — | — |
|  | 7 | — | — |

| PHYSICAL PORT NUMBER | ALLOCATION GROUP | LOGICAL PORT NUMBER |
|---|---|---|
| 0 | 0 | 0 |
| 1 | 0 | 1 |
| 2 | 1 | 0 |
| 3 | — | — |
| 4 | 0 | 2 |
| 5 | 1 | 1 |
| 6 | — | — |
| 7 | — | — |

I/O DEVICE SWITCHING METHOD

CLAIM OF PRIORITY

The present application claims priority from Japanese application JP 2007-156339 filed on Jun. 13, 2007, the content of which is hereby incorporated by reference into this application.

BACKGROUND OF THE INVENTION

The present invention relates to an I/O device switching method, and more particularly to an I/O device switching method that enables selective switching of plural I/O devices connected to a server device having an I/O switch, and a computer system that includes a management server that performs the switching control.

There are cases where a server device is connected with plural types of external devices such as network devices and storage devices that respectively have different protocols. Therefore, the server device is provided with plural I/O devices that process different protocols and make connections between the server device and external devices. In the case of general server devices, the correspondence between the server devices and the I/O devices is fixed, and cannot be changed. Therefore, in environments such as enterprises' computer systems and data centers in which numerous server devices are operating, necessary I/O devices must be selected for each of the server devices. However, if the correspondence between the server devices and the I/O devices is fixed, when the usage and the like of the server devices are changed, the I/O devices must be mounted or dismounted, making operation management complicated.

An I/O switch is one technology for solving this problem. The I/O switch is a device disposed between the server devices and the above-described I/O devices, and by controlling the configuration of the I/O switch, the I/O devices allocated to the server devices can be flexibly changed. Since plural server devices can be connected to the I/O switch, I/O devices can be flexibly allocated to the plural server devices, so that the complexity of operation management can be lessened.

A method of managing input/output interface modules is disclosed in Japanese Published Unexamined Patent Application No. 301488/2005. According to this method, a management server has a management table that manages specifications and connection states of input/output interfaces, and for an input-output device connection command from an integrated management server, consults the management table to select an input/output interface matching conditions and change its connection.

According to the related art, although the allocation of I/O devices to a server device is made flexible by the I/O switch, measures for reliability become complicated. For example, in the case of a server device having no I/O switch, in a multiplex configuration environment in which plural servers are used to achieve high reliability, when a failure occurs in any server device and it is switched to another, the server device and I/O devices included in it together are replaced. In this case, when a failure occurs in any one of in server devices, processing can be recovered by changing the server device regardless of the location of the failure. In short, since the entire server device including I/O devices is used as a switching unit, a switching method at failure can be simplified although the switching unit is large.

However, in the case of a server device including an I/O switch, since the server device is separated from I/O devices, it is necessary to correctly recognize the location of a failure and perform failure recovery suited for it. When a failure occurs in the server device, recovery from the failure can be made by changing the server device like a conventional method. However, when a failure occurs in an I/O device connected to the I/O switch, since processing of the server device is halted due to the failure in the I/O device, it appears that a failure occurs in the server device. Therefore, even if only the server device is switched using a conventional method, if the failure in the I/O device is not eliminated, recovery from the failure is impossible. For example, for recovery from a failure in an I/O device, the failed I/O device must be replaced by an I/O device of the same type as the failed I/O device. This means that a server device including an I/O switch cannot be recovered simply by detecting a failure in the server device differently from a conventional method. Therefore, by determining whether a server device fails or an I/O device fails, failure recovery suited for each case must be performed.

SUMMARY OF THE INVENTION

An object of the present invention is to enhance the reliability of a server device including having an I/O switch.

More specifically, the present invention is to accurately perform switching control for I/O devices connected to an I/O switch when a failure occurs in them.

The present invention is preferably an I/O device switching method in a computer system in which plural computers are connected to plural I/O devices for connecting with external devices via one or plural I/O switches, wherein the one or plural arbitrary I/O devices are allocated to the computers and the allocation is changed. According to the I/O device switching method, an I/O device management table that manages plural types of I/O devices connectable to the I/O switches is provided. The one or plural I/O devices not allocated to the computers are defined and registered as standby I/O devices in the I/O device management table. When a failure occurs in any one of the I/O devices, the I/O device management table is consulted to select the I/O device of the same type as the I/O device in which the failure has occurred, from among the standby I/O devices, and allocate it to a computer to which the I/O device in which the failure has occurred is connected.

A computer system of the present invention preferably includes: plural computers; one or plural I/O switches connected to the plural computers; plural I/O devices, connected to the I/O switches, for connecting with external devices; and a management server, connected to the plural computers via a network, that monitors states of the computers and the I/O devices and changes the allocation of the one or plural I/O devices connected to the computers. The management server includes: an I/O device management table that defines and manages, as standby I/O devices, one or plural I/O devices of plural types of I/O devices connectable to the I/O switches that are not allocated to the computers; a failure detecting unit that detects failures occurring in at least two or more of the I/O devices; an I/O device selecting unit that, when a failure is detected in the failure detecting unit, consults the I/O device management table to select an I/O device of the same type as the I/O device in which the failure has occurred; and an I/O device switching unit that switches the I/O device in which a failure has occurred to an I/O device selected by the I/O device selecting unit, and connects a newly switched I/O device to the computer via the I/O switches.

According to the present invention, reliability in a server device including an I/O switch can be enhanced. Particularly, when a failure occurs in a certain I/O device, a management table is consulted to select a standby I/O device, and connection switching for the I/O devices is controlled so as to connect an I/O switch to which a computer is connected, to the I/O device, whereby failure recovery can be accurately performed.

BRIEF DESCRIPTION OF THE DRAWINGS

FIG. 9 is a drawing showing the configuration of an I/O switch management table 108 in one embodiment;

FIG. 10 is a drawing showing the configuration of a server management table 109 in one embodiment;

FIG. 11 is a drawing showing the configuration of a server switching management table 110 in one embodiment;

FIG. 12 is a drawing showing the configuration of a device pool management table 111 in one embodiment;

FIG. 13 is a drawing showing the configuration of a load management table 112 in one embodiment;

FIG. 14 is a drawing showing the configuration of a port management table 406 in one embodiment;

DETAILED DESCRIPTION OF THE PREFERRED EMBODIMENTS

Hereinafter, embodiments of the present invention will be described with reference to the drawings.

Figure 1:
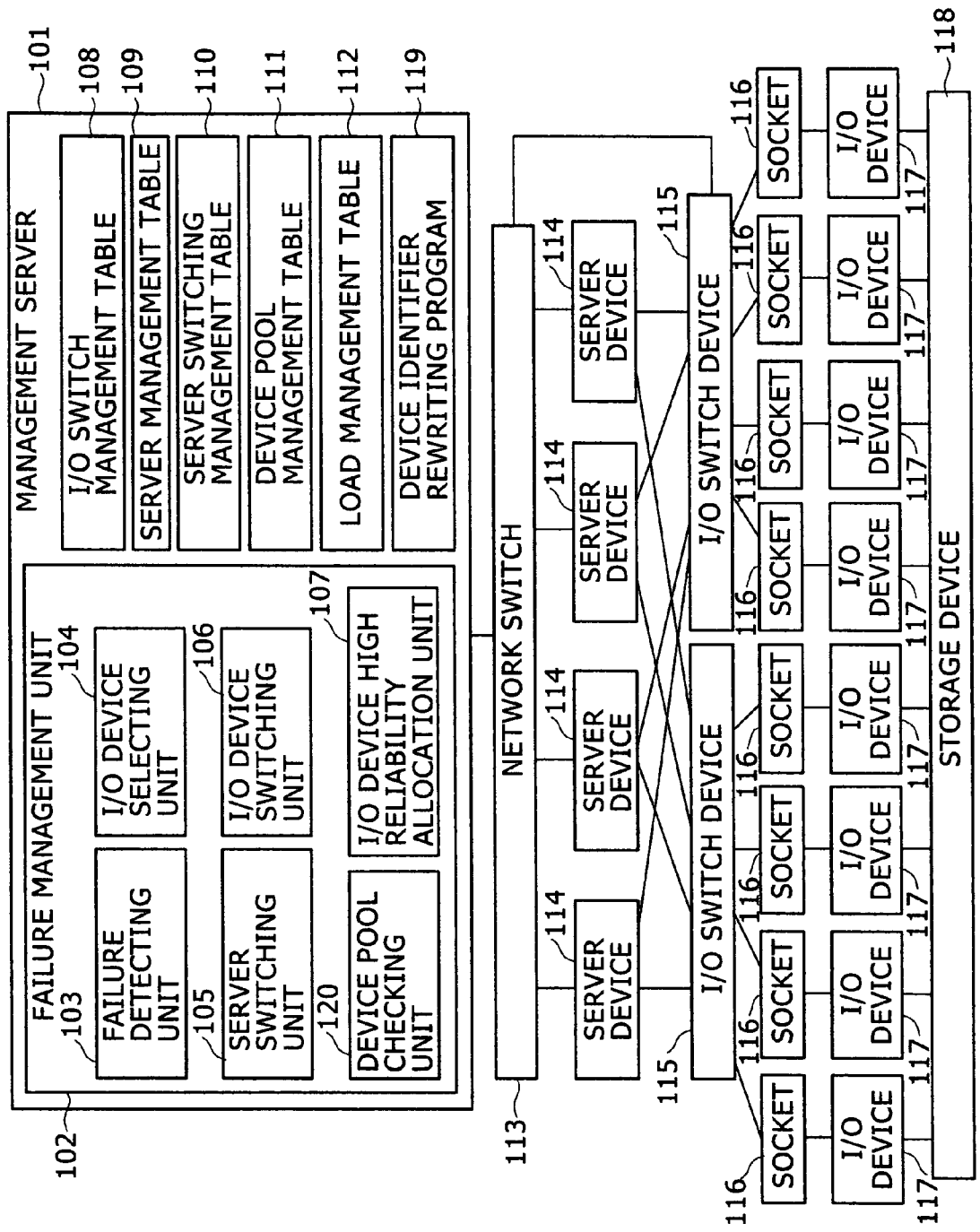
FIG. 1 is a drawing showing the configuration of a computer system in one embodiment.

FIG. 1 is a drawing showing an overall configuration of a computer system of one embodiment.

In the computer system, a management server 101 is connected to plural servers 114 via a network switch 113, and further plural server devices 114 are connected to plural switch devices 115. IO devices 117 are connected to switch devices 115 via plural sockets 116, and several of the IO devices are connected with a storage device 118 so that the server devices 114 can access the storage device 118. Usually, a job is executed between the server device 114 and the storage device 118, and the management server 101 performs failure monitoring and recovery control of the server devices 114 and the IO devices 117.

The management server 101 includes a failure management unit 102, various management tables 108 to 112, and a device identifier rewriting program 119. The failure management unit 102 includes a failure detecting unit 103, an I/O device selecting unit 104, a server switching unit 105, an I/O device switching unit 106, a device pool checking unit 120, and an I/O device high reliability allocation unit 107. The management server 101 detects and recovers failures in the server devices 114, the I/O switch devices 115, and the I/O devices 117.

The failure detecting unit 103 detects failures in the server devices 114, the I/O switch devices 115, and the I/O devices 117. The I/O device selecting unit selects an I/O device 117 to replace a failed I/O device 117. The server switching unit 105 switches to a standby server device 114 when a failure occurs in a server device 114. The I/O device switching unit 106 replaces a failed I/O device 117. The device pool checking unit 120 checks whether a sufficient number of I/O devices for replacement exist to provide for failures in the I/O devices 117. The I/O device high reliability allocation unit 107 allocates the I/O devices 117 for high reliability when the server devices 114 achieve high reliability by use of plural I/O devices 117.

The I/O switch management table 108 stores information of the server devices 114 and the I/O devices 117 that are connected to the I/O switch 115. The server management table 109 stores configuration information, status information, and the like of the server devices 114. The server switching management table 110 stores definition information of server devices 114 for replacement when the server devices 114 fail. The device pool management table 111 stores definition information of I/O devices 117 for replacement when the I/O devices fail. The load management table 112 stores information showing the magnitude of the load of the I/O switch devices 115. The device identifier rewriting program 119, executed by a processor 202 described later, rewrites a peculiar identifier of the I/O devices 117.

This embodiment shows an example that the management server 101 monitors failures in the server devices 114 and the I/O devices 117, and recovers to a normal state during the failures.

Figure 2:
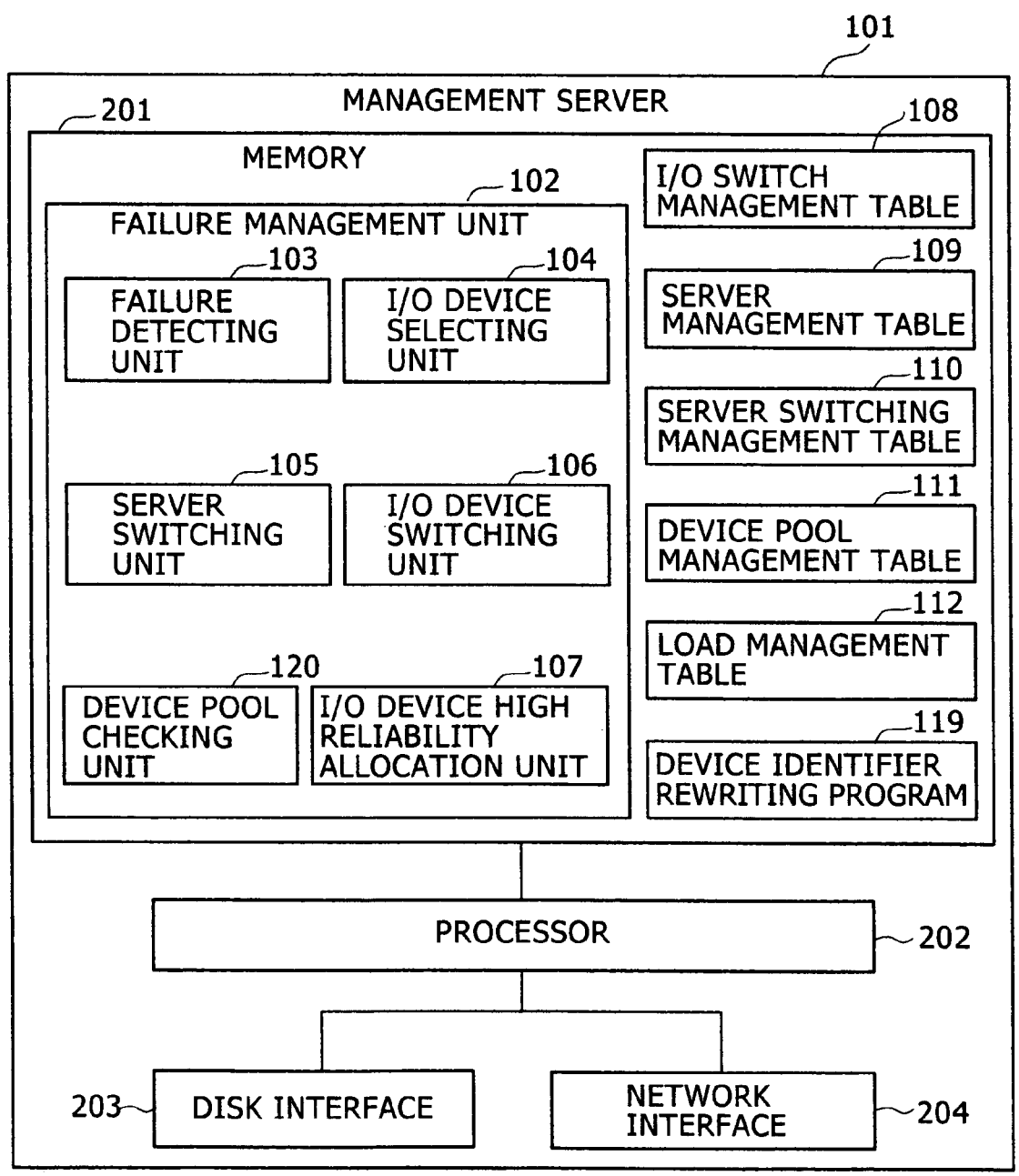
FIG. 2 is a drawing showing a detailed configuration of a management server 101 in one embodiment.

FIG. 2 shows a detailed configuration of the management server 101.

The management server 101 includes a memory 201, a processor 202, a disk interface 203, and a network interface 204. The memory 201 stores a failure management unit 102, an I/O switch management table 108, a server management table 109, a server switching management table 110, a device pool management table 111, a load management table 112, a device identifier rewriting program 119.

The failure management unit 102 includes the failure detecting unit 103, the I/O device selecting unit 104, the server switching unit 105, the I/O device switching unit 106, the device pool checking unit 120, and the I/O device high reliability allocation unit 107. The failure management unit 102 and the tables 108 to 112 in the memory are read into the processor 202 to achieve the required functions and operations. The disk interface 203 is connected to a disk in which a program for activating the management server 101 is stored. The network interface 204 is connected to a network and transfers failure information and the like of individual devices.

Figure 3:
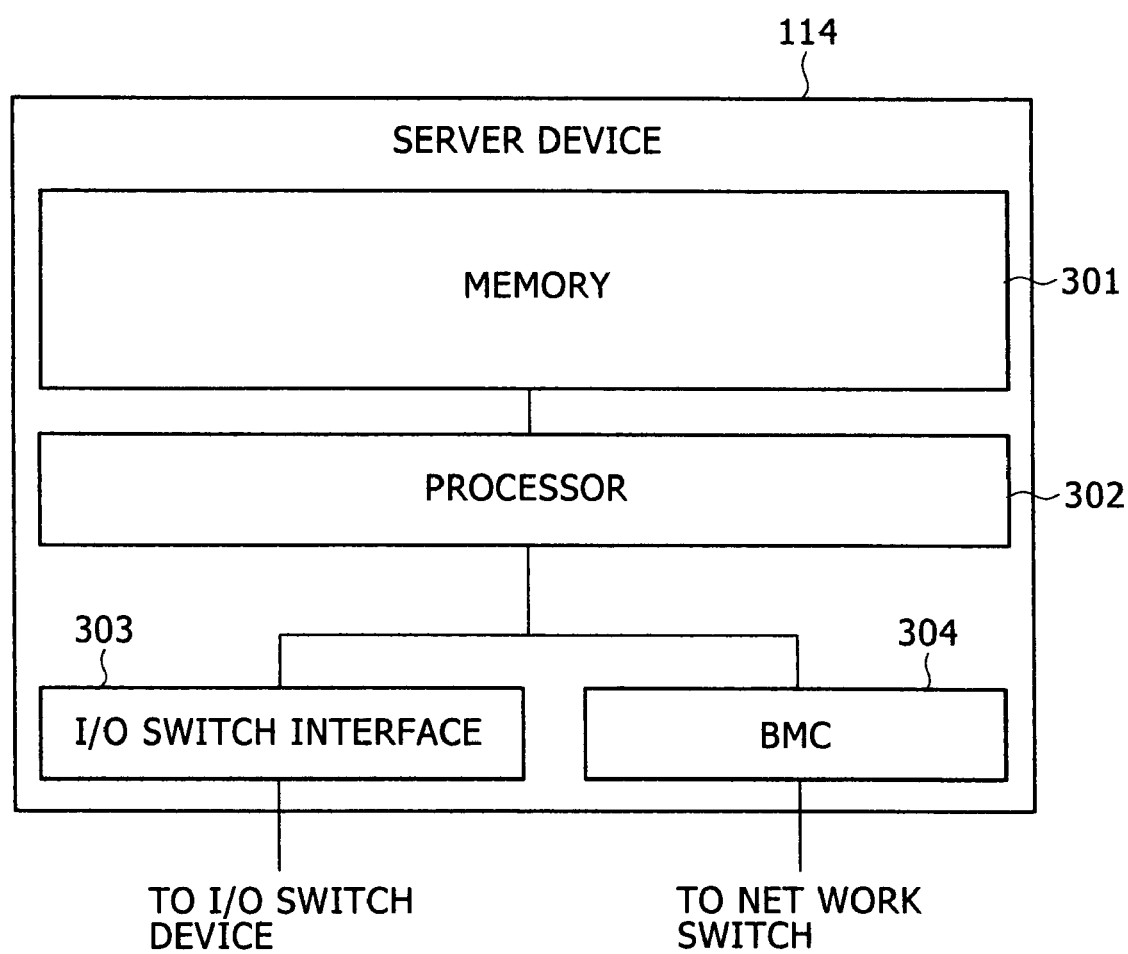
FIG. 3 is a drawing showing the configuration of a server device 114 in one embodiment.

FIG. 3 shows the configuration of the server devices 114.

The server device 114 includes a memory 301, a processor 302, an I/O switch interface 303, and a BMC (Base board Management Controller) 304. Programs processed by the server device 114 are stored in the memory 301, and executed by the processor 302. The I/O switch interface 303 is connected to the I/O switch device 115. A BMC 304, when a failure occurs in hardware within the server device 114, reports the failure via the network. Since the BMC 304 can operate independently of the location of the failure, it can transfer failure notification even when the failure occurs in the memory 301 and the processor 302.

Figure 4:
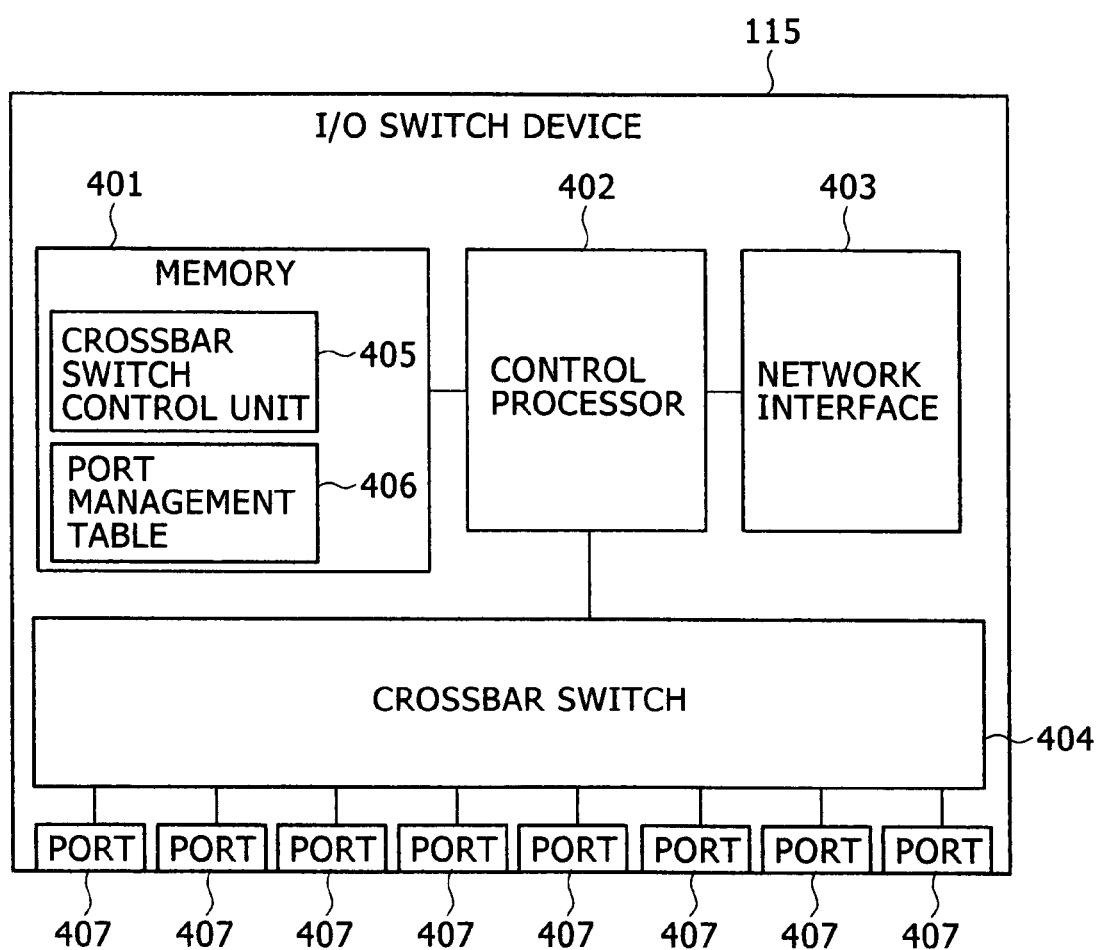
FIG. 4 is a drawing showing a detailed configuration of an I/O switch device 115 in one embodiment.

FIG. 4 shows the configuration of the I/O switch device 115.

The I/O switch device 115 includes a memory 401, a control processor 402, and a network interface 403, a crossbar switch 404, and ports 407. A crossbar switch control unit 405 and a port management table 406 are stored in the memory 401. The crossbar switch control unit 405 controls states and allocation of each of the ports 407. The crossbar switch control unit 405 and the port management table 406 in the memory 401 are read into the control processor 402 for execution. The I/O switch device 115, via the network interface 403, can transfer failure information of the I/O switches, and can receive commands for controlling the I/O switch devices 115. The port management table stores states and allocation information of each of the ports 407. The crossbar switch 404 controls data transfer with the ports 407.

Figure 5:
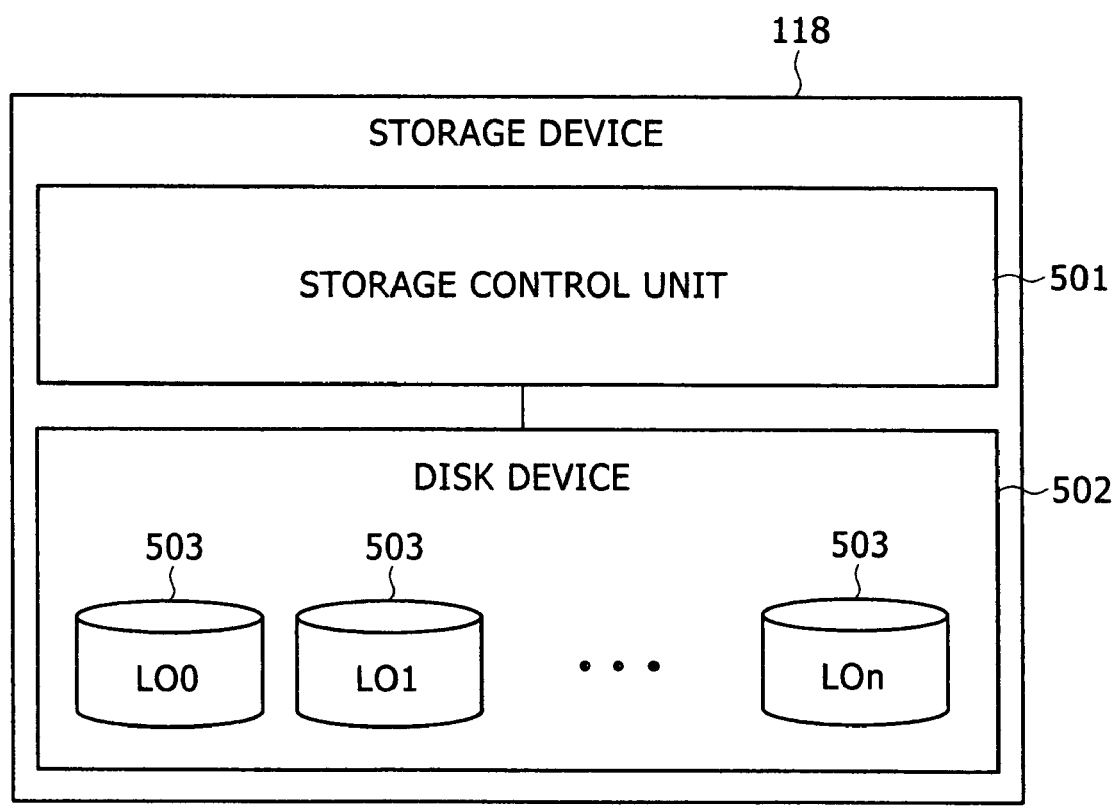
FIG. 5 is a drawing showing a detailed configuration of a storage device 118 in one embodiment.

FIG. 5 shows the configuration of the storage device 118.

The storage device 118 includes a storage control unit 501 and a disk drive 502. The storage control unit 501, connected with the server devices 114, controls reading from and writing to disks 503 in the disk drive 502. The disks 503 in the disk drive 502 each are assigned an identifier called a logical unit (LU) so that the server device 114 can identify the logical unit.

Figure 6:
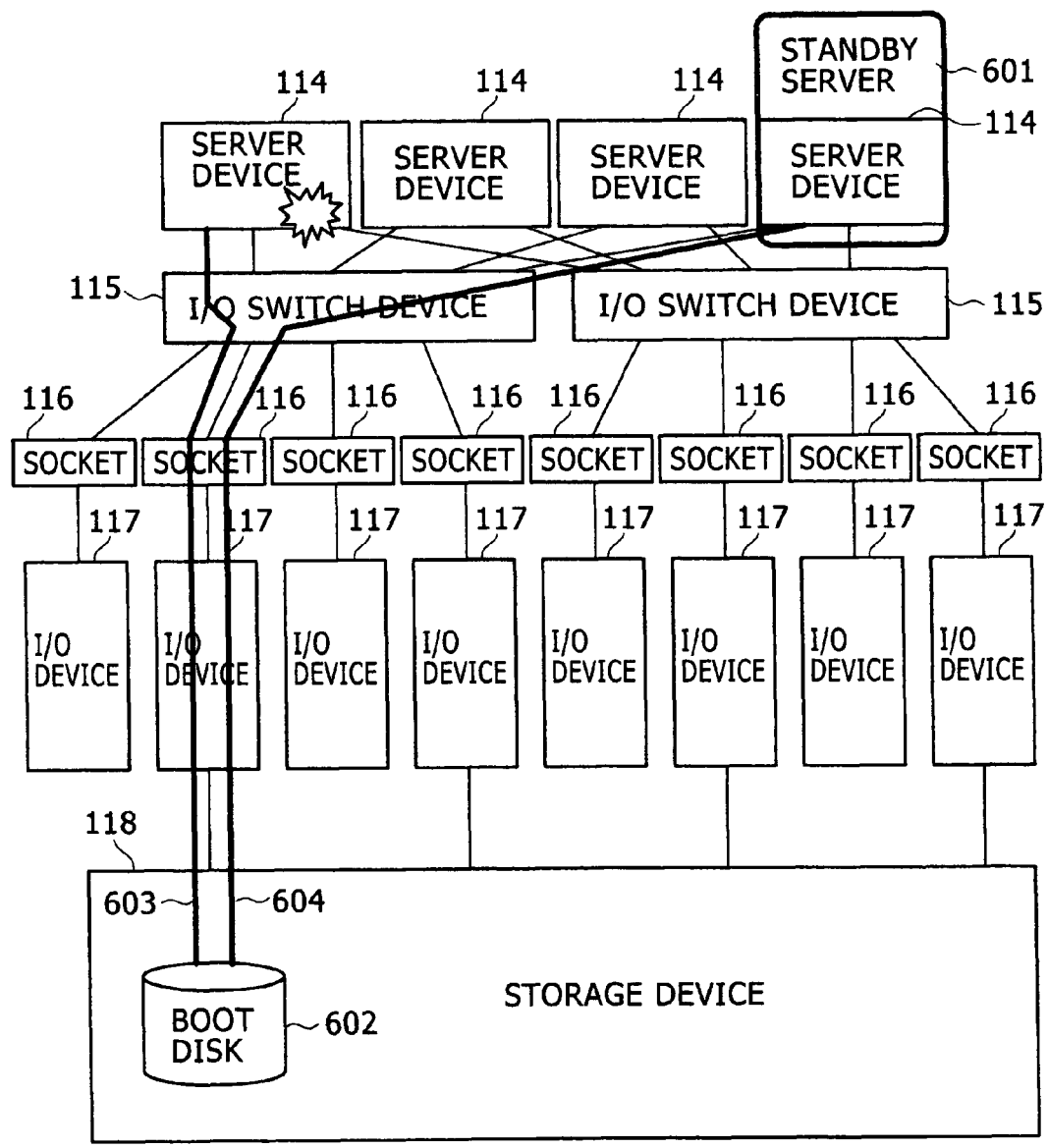
FIG. 6 is a drawing showing an example of recovery processing at a failure in a server device in one embodiment.

FIG. 6 shows an example of troubleshooting.

When a failure occurs in any one of the server devices 114, data transfer paths of the I/O switch devices 115 are changed to perform recovery operations by use of a standby server 601. The server devices 114 are divided into the roles of performing transaction processing and the like, and the roles of the standby server 601. The severs of any roles may be plurally provided.

In this embodiment, when a failure occurs in any one of servers that process transactions, processing is handed over to the standby server 601 set previously. For example, in a boot disk 602 in the disk drives 118, a program and data required to activate the server devices 114 are stored. However, by assigning the boot disk 602 having been used by the server device 114 in which a failure has occurred to the standby disk 601, processing of the server device 114 in which a failure has occurred can be handed over.

Therefore, the path of the I/O switch device 115 is changed. Specifically, a path before a failure occurs is changed to a path 604. Thereby, the server device 114 can recover from the failure. Since the failure recovery method allows the pre-failure I/O device 117 to be handed over to the post-failure standby server 601 for use, smooth handover becomes possible without changing the configuration of the server device 114.

Figure 7:
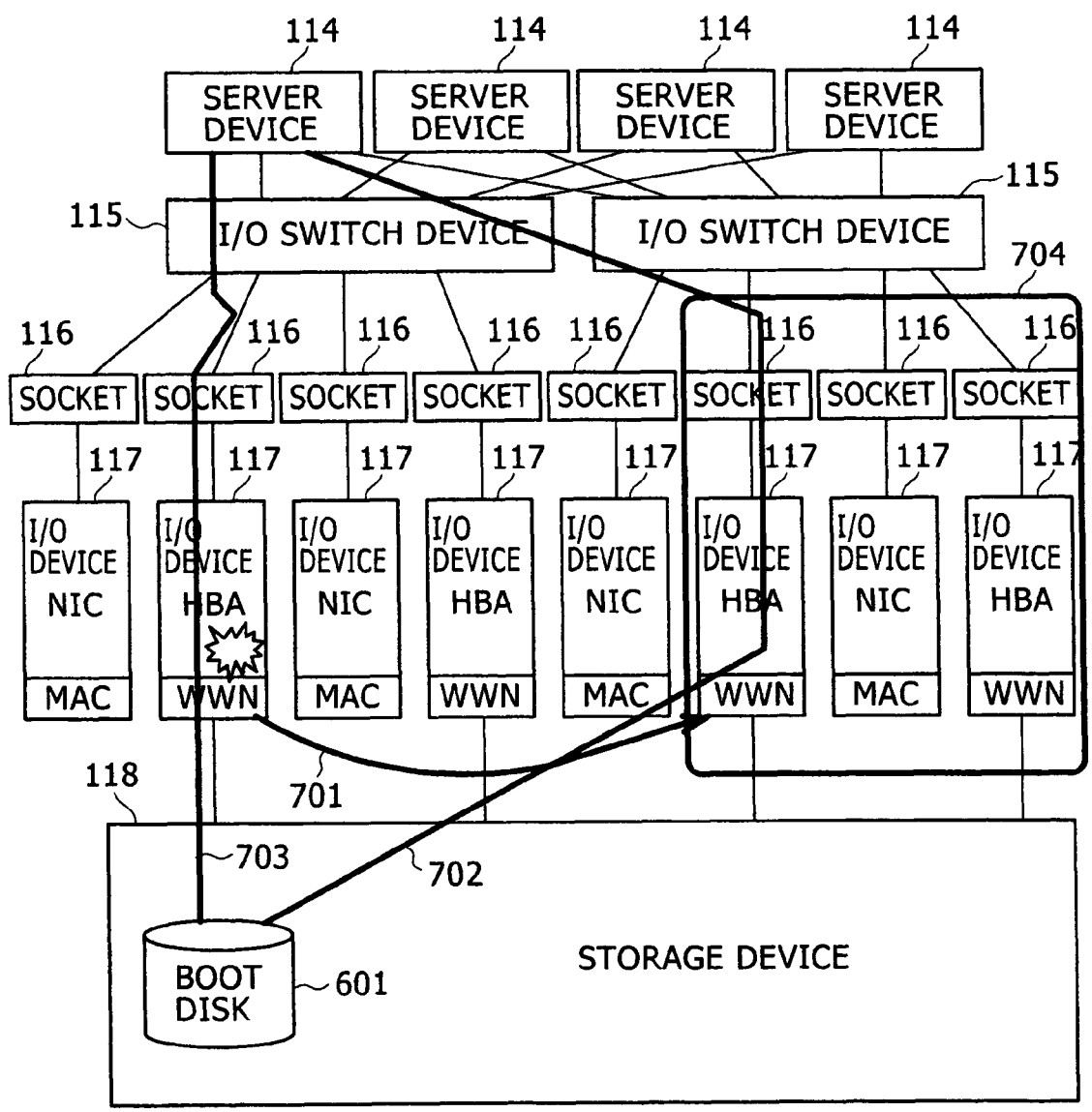
FIG. 7 is a drawing showing an example of recovery processing for I/O device failure when the number of device pools is one, in one embodiment.

FIG. 7 shows an example of failure recovery operation in one embodiment.

When a failure occurs in any one of the I/O devices 117, the I/O device is replaced to perform failure recovery operation. The present invention is characterized in that a device pool 704 that collectively manages unused devices for standby is provided. In the device pool 704, plural types of I/O devices are pooled to be used for replacement at failure. A user can freely connect the I/O switch devices 115 with the plural types of I/O device via the sockets 116. For example, a NIC (Network Interface Card) for network connection and HBA (Host Bus Adapter) for connection with the storage device 118 are available as the sockets. The I/O switch devices 115 provide a path through which any data can be transferred. The I/O devices 117, which have I/O functions, do not necessarily have same functions unlike the server devices 114.

Accordingly, when a failure occurs in any types of I/O devices, to provide for recovery from the failure, it is desirable that all types of I/O devices 117 are previously pooled (704). When a failure occurs in a certain I/O device 117', the I/O switch device 115 is controlled to change a path from 703 to 702. In this case, to replace the I/O device 117, an I/O device 117 of the same type as the failed I/O device 117 is selected from the device pool 704. Moreover, to avoid a change in the configuration of the server devices 114, specific information of the I/O device 117 is handed over (701). The specific information refers to, for example, MAC (Media Access Control address) address for NIC, and WWN (World Wide Name) for HBA. By these processes, even when a failure occurs in any I/O devices 117, the server device 114 can easily recover from the failure by replacing the failed I/O device 117' by another I/O device 117. Handing over specific information will not change the configuration of the server devices 114.

Figure 8:
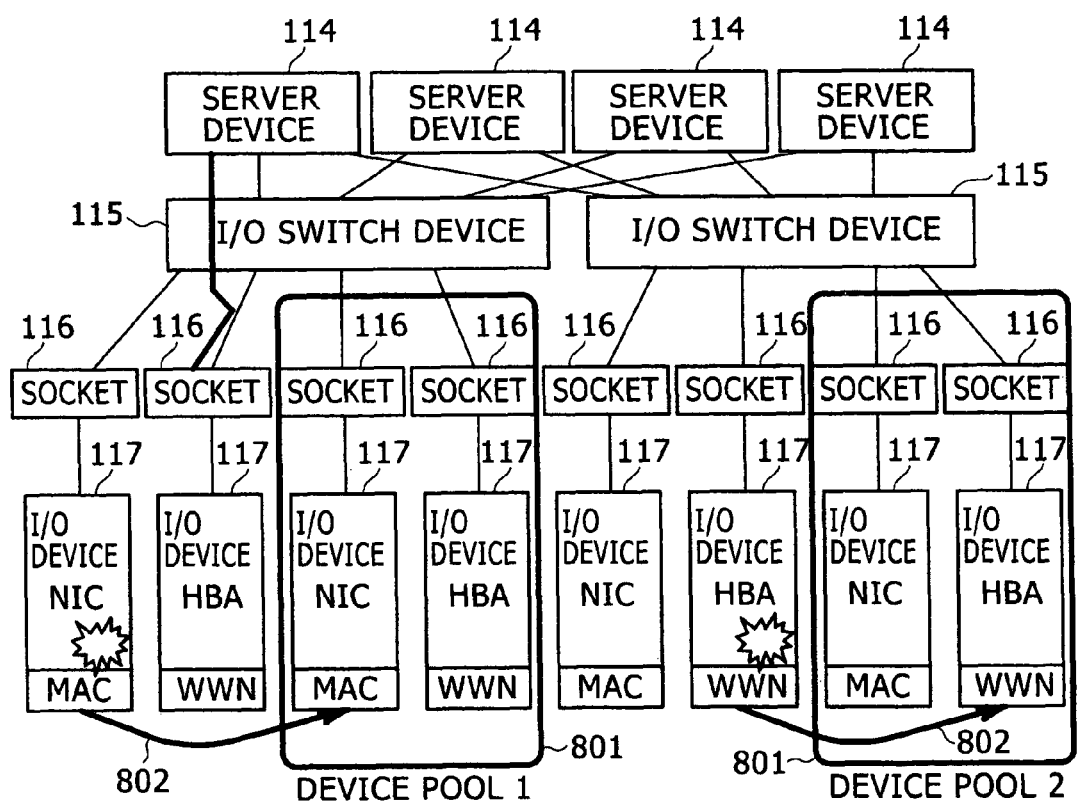
FIG. 8 is a drawing showing an example of recovery processing for I/O device failure when the number of device pools is plural, in one embodiment.

FIG. 8 shows another example of failure recovery operation in one embodiment.

In this example, plural (two) device pools 801 are set. When a failure occurs in an I/O device 117, an I/O device 117 having the same function can be selected from one of the device pools 801 for allocation. Like the example of FIG. 7, specific information of the I/O device can be handed over (802). By providing plural device pools 801, for example, the device pools may be divided by the performance of the I/O devices 117 to ease performance management, and divided by the type of the I/O devices 117 to ease type management. Moreover, the device pools may be divided by the I/O switch device 115 to perform failure recovery corresponding to a configuration brought into high reliability by multiplexed paths.

FIG. 9 shows the configuration of the I/O switch management table 108.

901 designates an I/O switch identifier allocated to each of the I/O switch devices 115. 902 designates the port number of an I/O switch device 115. 903 designates information showing the type of a device connected to a port; for example, MAC (Media Access Control address) address for NIC, and WWN (World Wide Name) for HBA. 904 designates a device identifier, which is specific information of each I/O device 117. 905 designates the state of an I/O device 117; for example, information such as normal operation possible and the occurrence of failure.

Information managed by the I/O switch management table 108 is updated when a change occurs in the I/O devices 117, such as when an I/O device 117 is newly connected, and when an I/O device 117 is replaced due to failure. By including the I/O switch management table 108, the I/O devices connected to the I/O switch devices 115 can be managed. Even when a failure occurs in an I/O device 117, and access to the I/O device 117 is disabled, a device identifier can be obtained.

FIG. 10 shows the configuration of the server management table 109.

1001 designates server device identifiers; 1002 designates the processor configurations of the server devices 114; 1003 designates information showing a memory configuration; 1004 designates port numbers of the I/O switch devices 115 to which the server devices 114 are connected; 1005 designates port numbers to which the I/O devices 117 allocated to the server devices 114 are connected; 1006 designates types of the I/O devices 117 allocated to the server devices 114; and 1007 designates information showing the logical unit numbers of disks allocated to the server devices. The I/O devices 117 allocated to the server devices 114 can be managed by the server management table 109.

FIG. 11 shows the configuration of the server switching management table 110.

1101 designates server identifier. 1102 designates the identifiers of server devices to serve as switching destinations when the server devices fail. For example, information indicating use of HOST4 as a replaceable sever device when a failure occurs in HOST1 is stored. 1103 designates I/O multiplexed connection configurations; for example, information indicating that NIC and HBA of HOST1 are multiplexed and are highly reliable, respectively. By multiplexing the I/O devices 117, even when a failure occurs in any one of the I/O devices, normal I/O devices can be used to continue processing.

To hide the switching of an I/O device 117 from a program running on the server devices 114, a multiplexed I/O device can be defined by a virtualized identifier. For example, by hiding the switching of an I/O device 117 by use of a virtual MAC address different from a MAC address of physical NIC, the program is made unaware of the occurrence of a failure. When no I/O multiplexed connection configuration is defined, 1103 is blank. 1104 designates information showing the state of the servers; for example, information such as normality or failure.

By the server switching management table 110, server devices for replacement when a failure occurs in the server devices 114 can be defined. Since I/O multiplexed connection configuration can be specified, the server switching management table 110 can be used as information for performing recovery with high reliability when a failure occurs in the I/O devices 117 and the like.

FIG. 12 shows the configuration of the device pool management table 111. 1201 designates the identifiers of the I/O switch devices 115. 1202 designates port numbers. 1203 designates the allocation of the I/O devices 117. For example, information indicating whether the I/O devices 117 have been allocated to the server devices 114 is shown. 1204 designates information indicating the state of device pool allocation.

In the example of the drawing, ports 6 and 7 of SW1/SW2 are allocated as device pools. Since the device pools stipulate I/O device 117 for replacement, when a failure occurs in an I/O device 117, a manager can allocate an I/O device of a replacement destination according to the type and priority of the I/O device 117.

The I/O devices 117 allocated to a device pool do not need to have consecutive port numbers but may be allocated to inconsecutive ports. Plural device pools may be provided to one I/O switch device 115. If the number of I/O devices 117 increases, increasing the number of I/O devices 117 defined as a device pool increases the reliability of the entire system. Not all unallocated I/O devices 117 may be defined in a device pool. For example, the manager can manually set unallocated I/O devices 117 not belonging to a device pool in preparation for applications for allocation.

FIG. 13 shows the configuration of the load management table 112.

The word load refers to the load of the I/O switch devices 115. 1301 designates the identifiers of the I/O switch devices 115. 1302 designates port numbers. 1303 designates total transfer data amounts. 1304 designates traffic quantities per unit time. The load management table 112 is updated by periodically acquiring performance information from a network interface 403 of the I/O switch devices 115. It becomes possible to know the load of each port of the I/O switch devices 115 by the load management table 112.

FIG. 14 shows the configuration of the port management table 406.

1401 designates physical port numbers of the I/O switch devices 115. 1402 designates information showing allocation groups. The allocation group indicates a chain of ports; for example, data can be transferred between ports of an identical allocation group, but data cannot be transferred with a different allocation group. 1403 designates logical port numbers; port numbers are virtualized for the server devices 114. For example, since a logical port of 2 is allocated to a physical port number of 4, it appears to the server devices 114 that the port number is 2.

By virtualizing ports, the configuration of hardware can be flexibly allocated to the server devices 114. For example, when a failure occurs in an I/O device 117, and it is replaced by another I/O device 117, the configuration can be made to be apparently identical by use of ports' virtualization. Moreover, even in the server device 114 to which identical I/O devices 117 are allocated, the operating system may recognize the devices in a different order because the order of port numbers to which the I/O devices 117 are connected has changed. As a result, the order of the disks is changed and a malfunction may occur. In such a case, the malfunction can be avoided by changing the order by use of logical ports.

Figure 15:
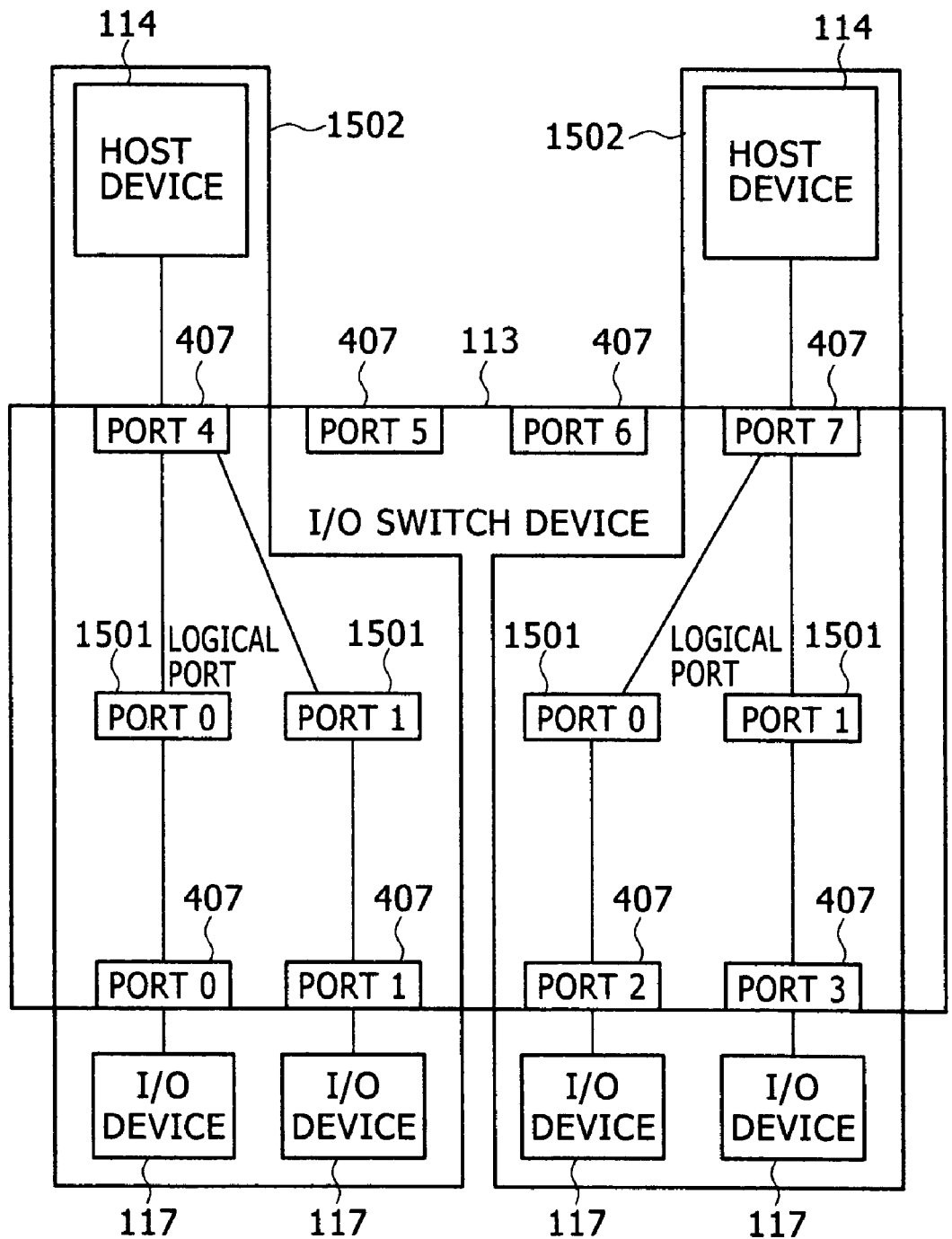
FIG. 15 shows an example of the allocation of I/O switch devices in one embodiment.

FIG. 15 shows an example of the allocation of I/O switch devices 115.

Any I/O devices 117 can be allocated to the host device 114 by use of functions of an allocation group 1502. Port numbers 407 to which the I/O devices 117 are connected can be virtualized into logical ports 1501 to be shown to the server devices 114. Since the allocation group 1502 blocks access to the I/O devices 117 from another allocation group 1502, reliability can be increased.

Figure 16:
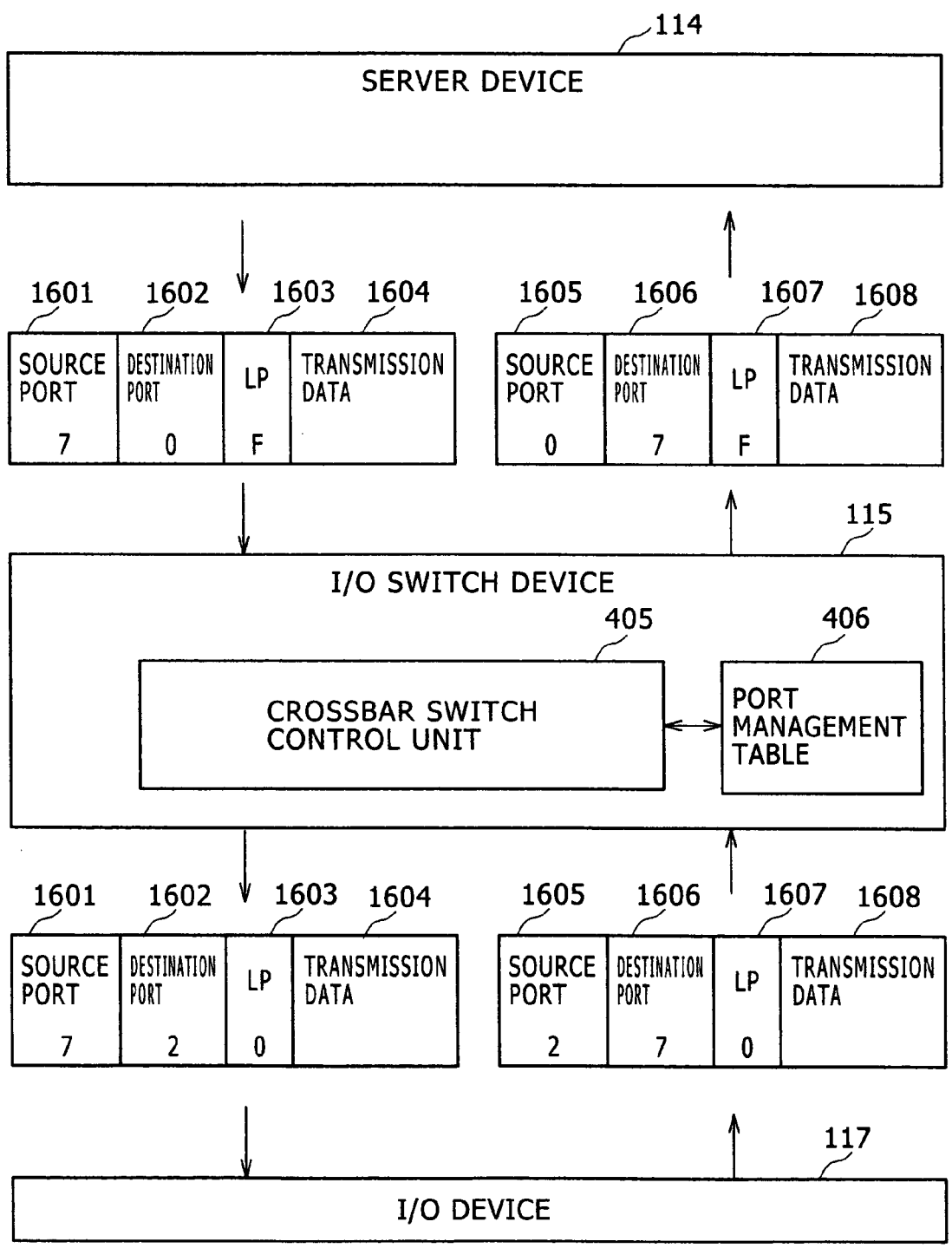
FIG. 16 is a drawing showing a procedure for converting logical ports in one embodiment.

FIG. 16 shows a procedure for converting logical ports.

A packet configuration at data transmission from the server device 114 to the I/O switch device 115 is shown in 1601 to 1604. 1601 designates the number of a source port; 1602 designates the number of a destination port; 1603 designates an area to temporarily store a logical port; and 1604 designates transmission data. When a packet from 1601 to 1604 is transferred to the I/O switch device 115, the destination port number 1602 is converted from a logical port number into a physical port number by a crossbar switch control unit 405 and a port management table 406 before being transferred to the I/O device 117. In this case, the logical port number is saved in the 1603 area (LP) because re-conversion into the logical port number during packet return.

When data is returned from the I/O device 117, contrary to packet transmission, conversion from the physical port into the logical port is made by the crossbar switch control unit 405 and the port management table 406 (1606), and the logical port is transferred to the server device 114. At packet return, unlike transmission, a source port number 1605 and a destination port number 1606 become reverse to each other.

The returned data is stored in 1608. The logical port number (LP) saved at the transmission is stored in 1607, and by referring to the 1607 area, the crossbar switch control unit 405 can return a port to a logical port recognized by the server device 114.

Figure 17:
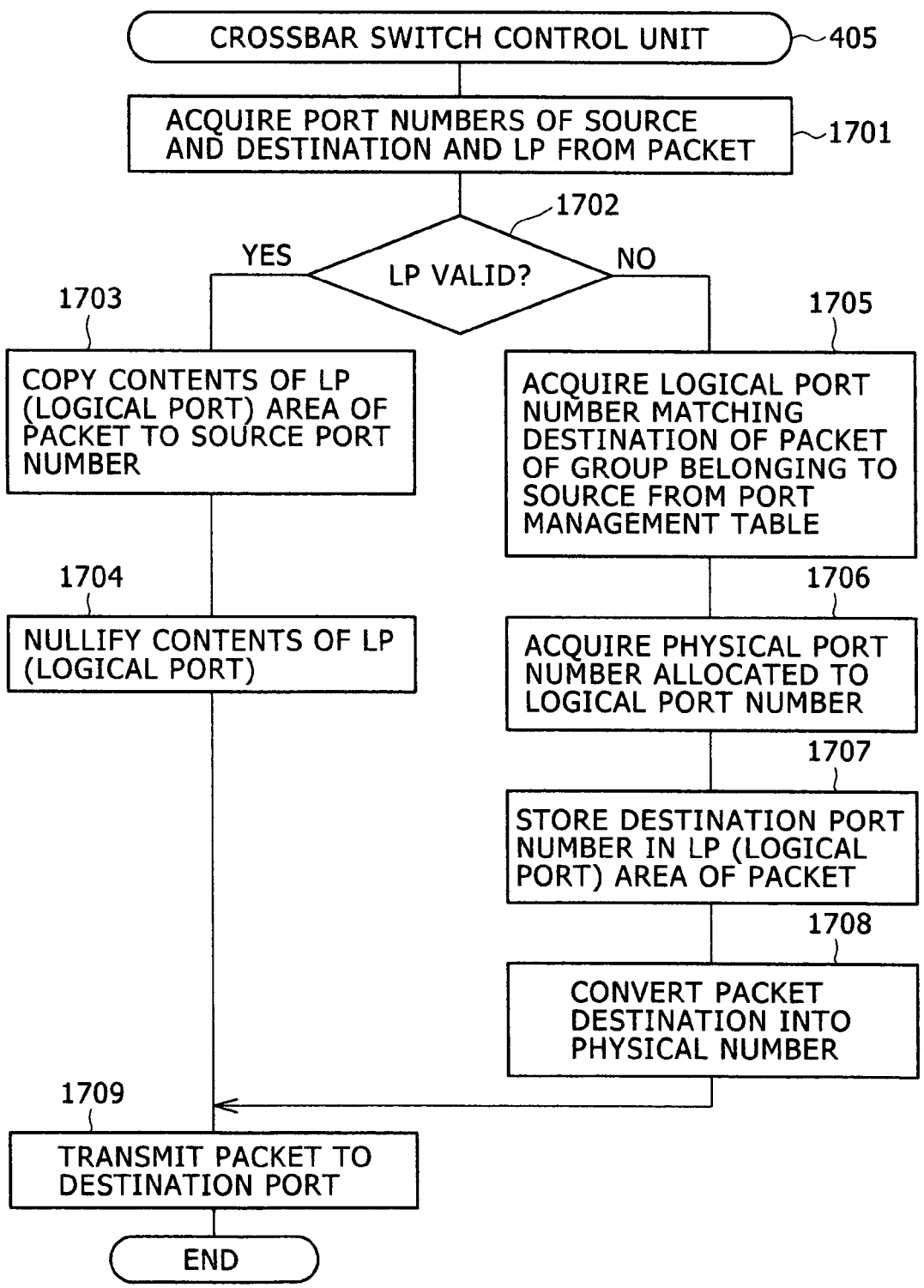
FIG. 17 is a drawing showing a processing flowchart by a crossbar switch control unit 405.

FIG. 17 shows a flowchart of logical port conversion processing by the crossbar switch control unit 405.

First, the crossbar switch control unit 405 acquires port numbers of a transmission source and a destination and LP from a packet (S1701). It checks whether a logical port number (LP) is valid (S1702). For example, "FF" can be defined for "invalid". When the LP is valid, it proceeds to S1703 to copy the content of the LP (logical port) area of the packet to a source port number. It nullifies the content of the LP (logical port) area (S1704), and transmits the packet to the destination port (S1709).

On the other hand, when the LP is not valid, the crossbar switch control unit 405 proceeds to S1705 to acquire a logical port number matching the destination of a packet of a group belonging to the source from the port management table 406. It acquires a physical port number allocated to the logical port number (S1706). This can be achieved by referring to the port management table 406. It stores a destination port number in the LP area of the packet (S1707). Thereby, when the packet is returned, the logical port number issued by the server device 114 can be restored. Finally, it converts the destination of the packet into a physical number (S1708), and transmits the packet to the destination port (S1709). By this processing, a physical port number and a logical port number can be converted.

Figure 18:
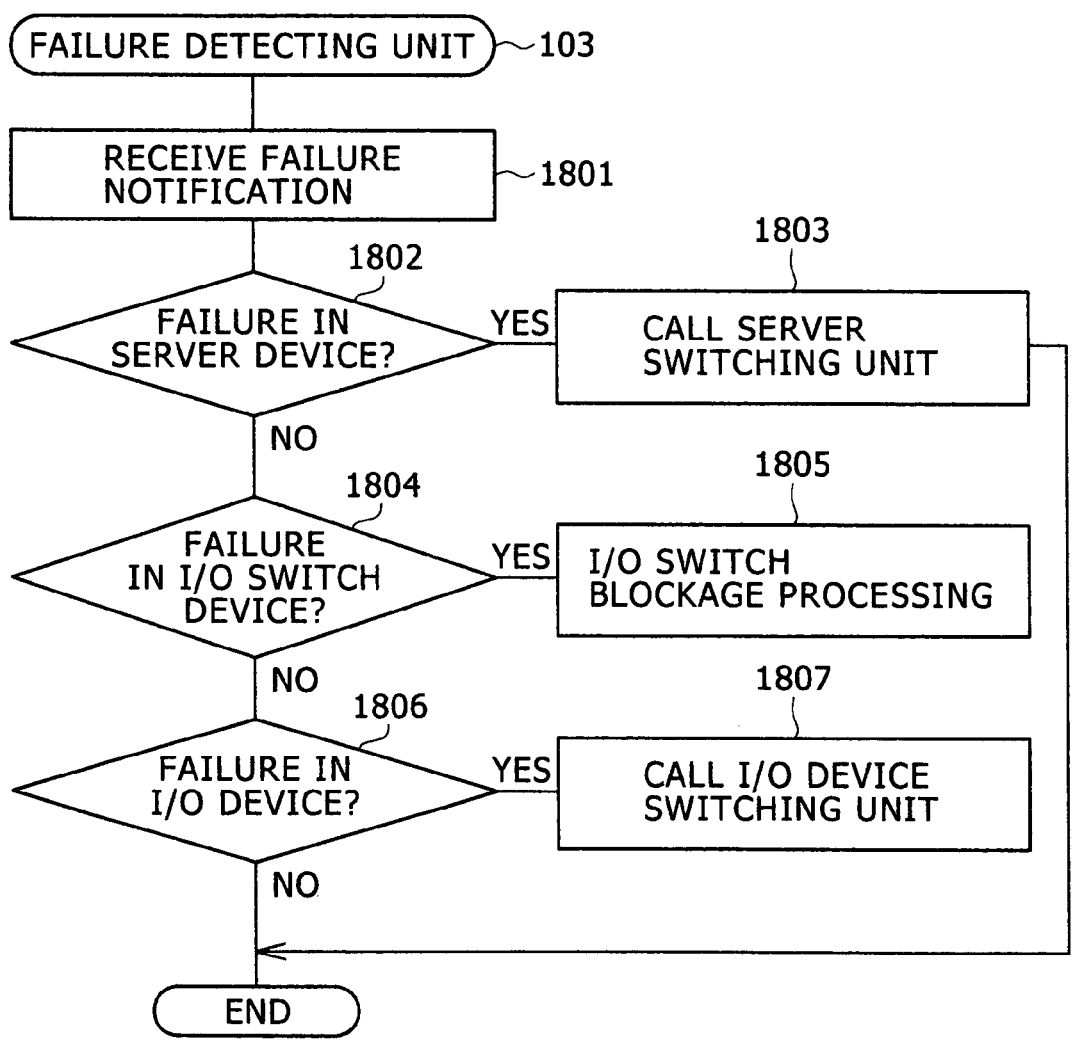
FIG. 18 is a drawing showing a processing flowchart by a failure detecting unit 103 in one embodiment.

FIG. 18 shows a processing flow by the failure detecting unit 103.

When failure notification is received (S1801), the failure notification is transferred from a device in which a failure has occurred to the management server 101. The management server 101 determines whether the server device 114 fails (S1802). As a result of the determination, when the server device 114 fails, the failure detecting unit 103 proceeds to S1803 to call the server switching unit. Then, it determines whether the I/O switch device 115 fails (S1804). As a result of the determination, when the I/O switch device 115 fails, it proceeds to S1805 to perform blockage processing for the I/O switch device.

After that, the failure detecting unit 103 determines whether an I/O device 117 connected to the I/O switch device 115 fails (S1804). As a result of the determination, when the I/O device 117 fails, it proceeds to S1807 to call the I/O device switching unit.

By this processing, a recovery method can be changed depending on whether the server device 114 or the I/O device 117 fails. Thereby, since the server device 114 that newly allocates an I/O device 117 in which no failure has occurred can continue to be used, hardware necessary for recovery can be reduced.

Figure 19:
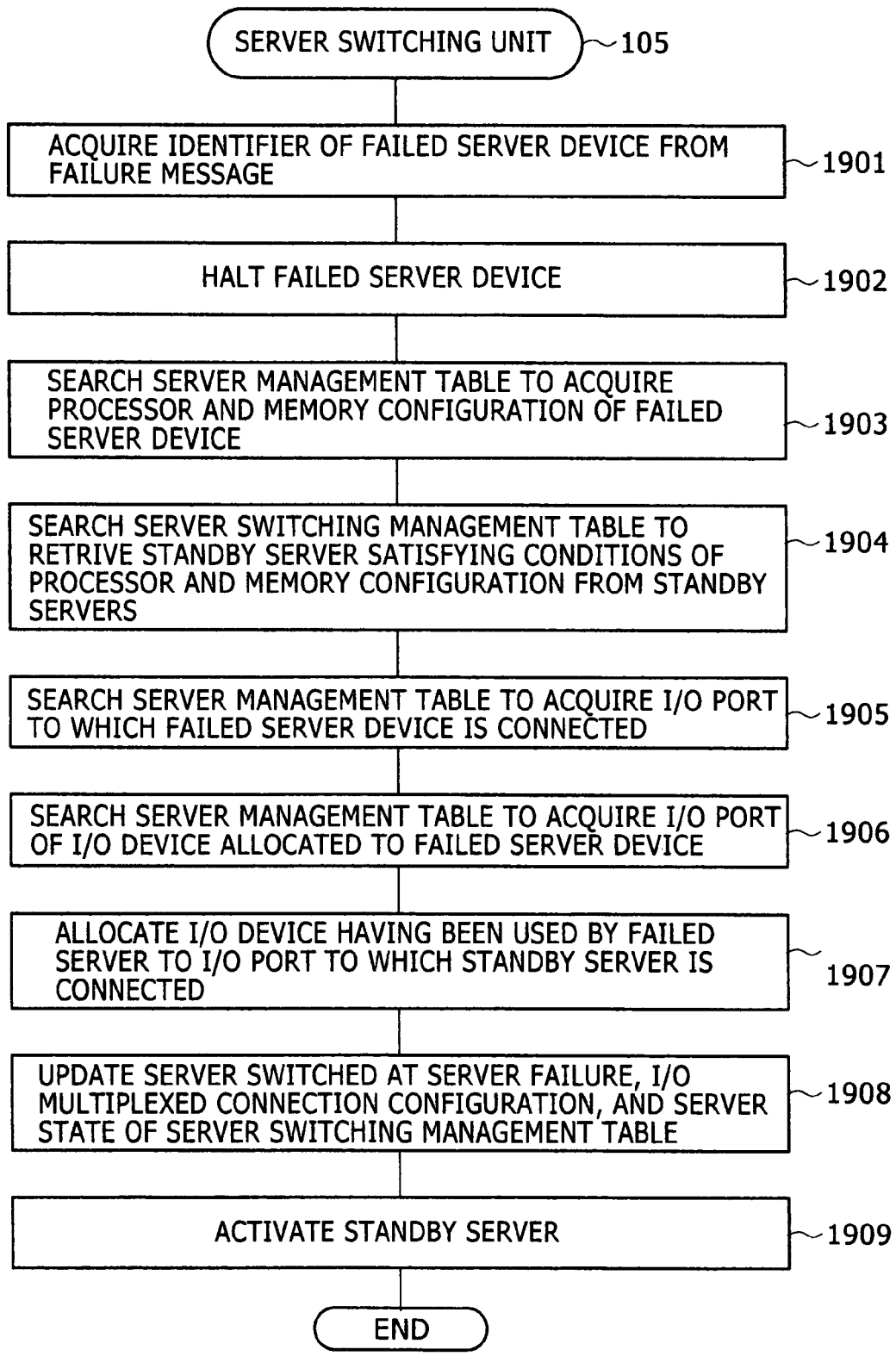
FIG. 19 is a drawing showing a processing flow of a server switching unit 105 in one embodiment.

FIG. 19 shows a processing flow by the server switching unit 105.

First, the server switching unit 105 acquires the identifier of a server device in which a failure has occurred, from the failure message (S1901). It halts the server device in which the failure has occurred (S1902). This is done to prevent the issuance of an unnecessary I/O by the server device 114 in which the failure has occurred, and to release an I/O device 117 allocated by the server device 114.

Next, the server switching unit 105 searches the server management table 109 to acquire the configuration of processor 302 and memory 301 of the server device 114 in which the failure has occurred (S1903). Furthermore, it searches the server switching management table 110 to retrieve a standby server satisfying the configuration conditions of processor 302 and memory 301 from standby servers (S1904). Moreover, it searches the server management table 109 to acquire an I/O port number to which the server device 114 in which the failure has occurred is connected (S1905).

Moreover, the server switching unit 105 searches the server management table 109 to acquire the I/O port number of an I/O device allocated to the server device in which the failure has occurred (S1906). It allocates the I/O device 117 having been used by the server device 114 in which the failure has occurred to an I/O port to which the standby server is connected (S1907), and updates the server switched at server failure 1102, the I/O multiplexed connection configurations 1103, and the server state 1104 of the server switching management table 110 (S1908). Finally, it activates the standby server (S1909).

By this processing, when a failure occurs in the server device 114, the I/O device 117 having been used by the server device 114 in which the failure has occurred can be handed over to the standby server device 114.

Figure 20:
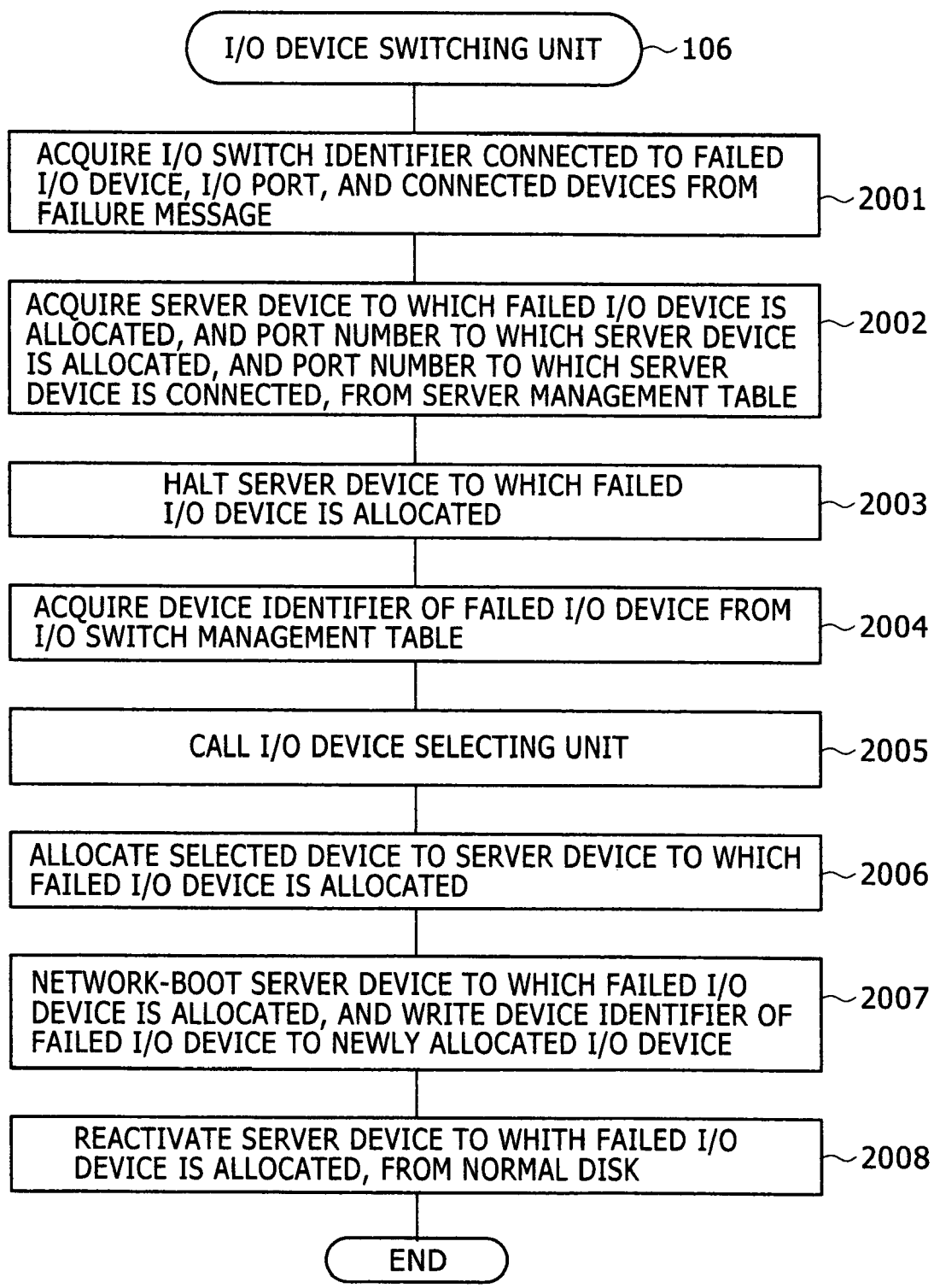
FIG. 20 is a drawing showing a flowchart of an I/O device switching unit 106 in one embodiment.

FIG. 20 shows a processing flow of the I/O device switching unit 106.

First, the I/O device switching unit 106 acquires an I/O switch identifier 904 connected to an I/O device 117 in which a failure has occurred, an I/O port 902, and a connected device 903, from a failure message (S2001). Moreover, it acquires a server device 114 to which the I/O device 117 in which the failure has occurred is allocated and a port number 1004 to which the server device 114 is connected, from the server management table 109 (S2002). It halts the server device 114 to which the I/O device 117 in which the failure has occurred is allocated (S2003). This is done to prevent the issuance of an unnecessary I/O by the server device 114 in which the failure has occurred, and to release an I/O device 117 allocated by the server device 114.

Next, the I/O device switching unit 106 acquires the device identifier 904 of the I/O device 117 in which the failure has occurred, from the I/O switch management table 108 (S2004), and calls the I/O device selecting unit 104 (S2005). Then, it allocates the I/O device 117 selected in S2005 to the server device 114 to which the I/O device 117 is allocated (S2006). Thereby, it can allocate an I/O device 117 for replacement to the server device 114.

After that, the I/O device switching unit 106 network-boots the server device 114 to which the I/O device 117 in which the failure has occurred is allocated, and writes the device identifier 904 of the I/O device 117 to a newly allocated I/O device 117 (S2007). The network-booted program is the device identifier rewriting program 119. The device identifier rewriting program 119 is stored with a minimum necessary program activated using the server device 114, and a program for rewriting a device identifier 904. Thereby, since the same device identifier 904 as the I/O device 117 in which the failure has occurred can be handed over to the newly allocated I/O device 117, the server device 114 can be activated without changing the system configuration.

Finally, the server device 114 to which the I/O device 117 in which the failure has occurred is allocated is activated from a normal disk (S2008).

In this embodiment, to rewrite the device identifier 904, the server device 114 to which the I/O device 117 in which a failure has occurred is connected is used. However, any of the server devices 114 that can activate the device identifier rewriting program 119 may be used. In this case, an I/O device 117 whose device identifier is to be rewritten must be previously allocated to a server device 114 that activates the device identifier rewriting program 119. Upon completion of the device identifier rewriting program 119, the I/O device 117 can be reconnected to the server device 114 to which I/O device 117 in which a failure has occurred is connected. Thereby, the system can be recovered to the same environment that it was in before the failure occurred.

Figure 21:
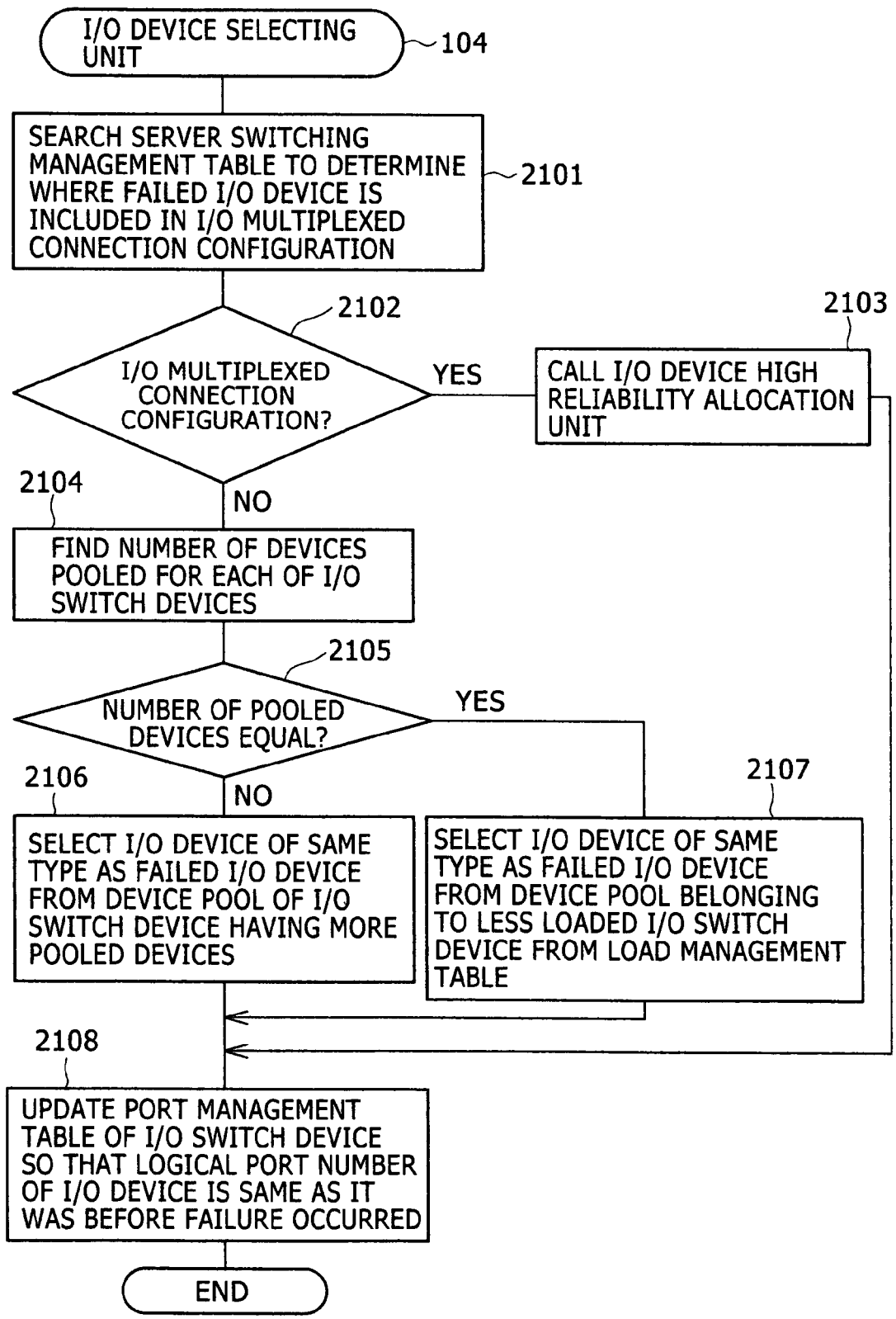
FIG. 21 is a drawing showing a flowchart of an I/O device selecting unit 104 in one embodiment.

FIG. 21 shows a processing flow of the I/O device selecting unit 104.

The I/O device selecting unit 104 searches the server switching management table 110 to determine whether an I/O device 117 in which a failure has occurred is included in the I/O multiplexed connection configuration 1103 (S2101). When the I/O device 117 is the I/O multiplexed connection configuration 1103, it proceeds to S2103 to call the I/O device high reliability allocation unit 107 (S2103). On the other hand, when the failed I/O device 117 is not the I/O multiplexed connection configuration 1103, it finds the number of devices pooled for each of the I/O switch devices 115 (S2104).

The I/O device selecting unit 104 determines whether the calculated number of pooled devices is equal among the I/O switch devices 115 (S2105). As a result of the determination, when the number of pooled devices is equal, it consults the load management table 112 to select an I/O device 117 of the same type as the failed I/O device 117 from a device pool 1204 belonging to a less loaded I/O switch device 115 (S2107). Thereby, loads can be balanced among the I/O switches.

On the other hand, when the number of pooled devices is unequal, it selects an I/O device 117 of the same type as the failed I/O device 117 from a device pool 1204 of an I/O switch device 115 having more pooled devices (S2106). Thereby, the number of device pools can be equalized among the I/O switch devices 115. It updates the port management table 406 of the I/O switch devices 115 so that the logical port number 1501 of the I/O device 117 is the same as that before a failure occurs (S2108). Thereby, the I/O configuration can be held the same as it was before the I/O device 117 failed, so that high compatibility can be maintained.

Figure 22:
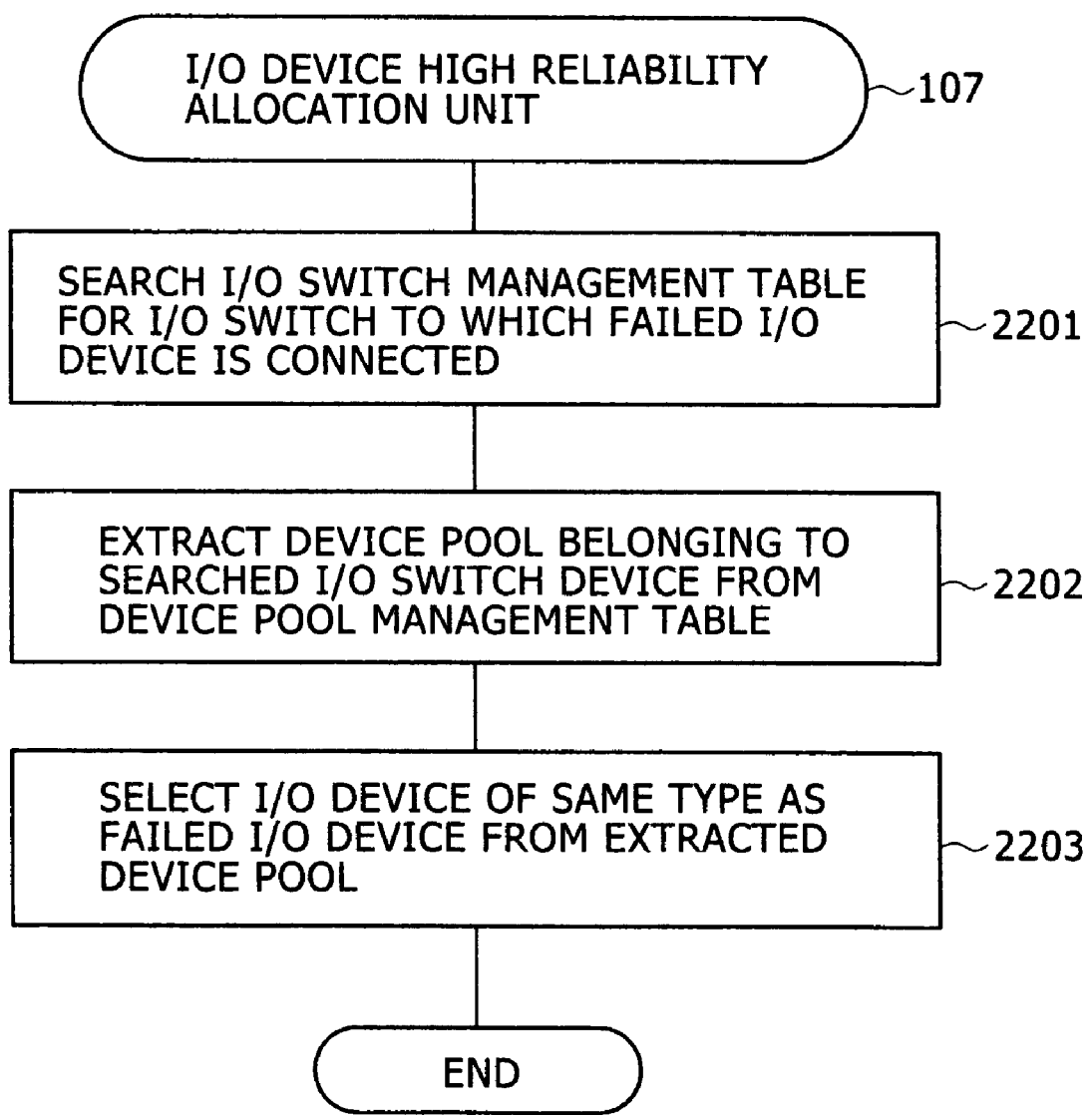
FIG. 22 is a drawing showing a flowchart of an I/O device high reliability allocation unit 107 in one embodiment.

FIG. 22 shows a processing flow of the I/O device high reliability allocation unit 107.

The I/O device high reliability allocation unit 107 searches the I/O switch management table 108 for an I/O switch device 115 to which an I/O device 117 in which a failure has occurred is connected (S2201). It extracts a device pool belonging to the I/O switch device 115 obtained in S2201 from the device pool management table 111 (S2202). After that, it selects an I/O device 117 of the same type as the failed I/O device 117 from the extracted device pool 1204 (S2203).

By this processing, when plural I/O devices 117 are used to achieve high reliability within a server device 115, by performing setting so that the plural I/O devices 117 pass through the I/O switch devices 115 via different paths, the I/O devices can be replaced with high reliability maintained.

Figure 23:
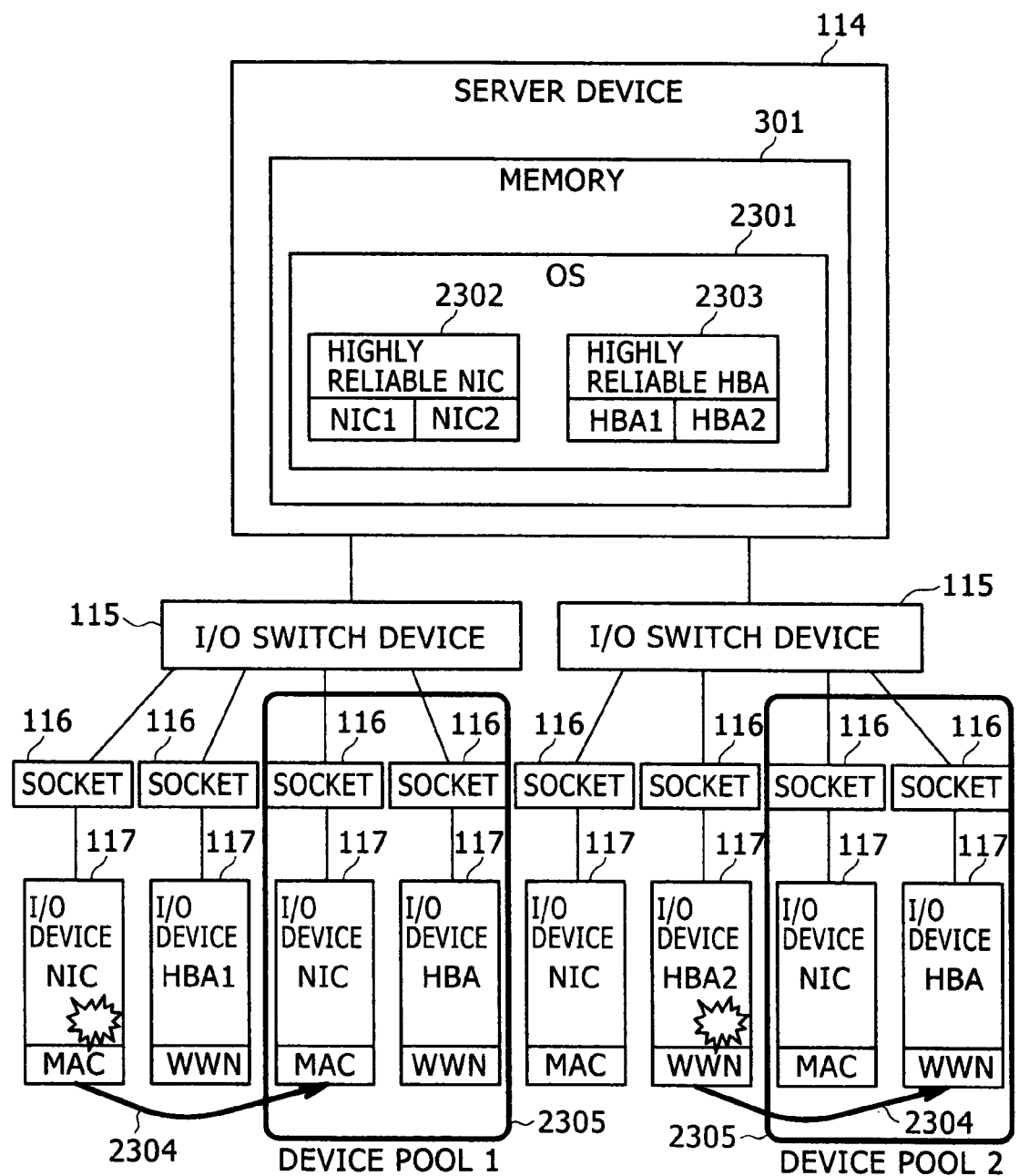
FIG. 23 is a drawing showing an example of an I/O device high reliability allocation in one embodiment.

FIG. 23 outlines the operation of the I/O device high reliability allocation unit 107.

In an operating system (OS) 2301 stored in a memory 301 in a server device 114, an operation example when high reliability 2303 of NIC and HBA is set is shown. To achieve high reliability, plural NIC and HBA are used. When the I/O switch devices 115 are multiplexed, by performing setting for passage through I/O switch devices 115 different from each other, higher reliability can be achieved. To hand over such a highly reliable configuration when an I/O device 117 fails, a device pool 2305 is provided for each of the I/O switch devices 115, an I/O device 117 for replacement is allocated from a device pool 2305 belonging to an I/O switch 115 to which the failed I/O device 117 is connected. In this case, by handing over (2304) a MAC address and a device identifier such as WWN, higher compatibility can be achieved.

Figure 24:
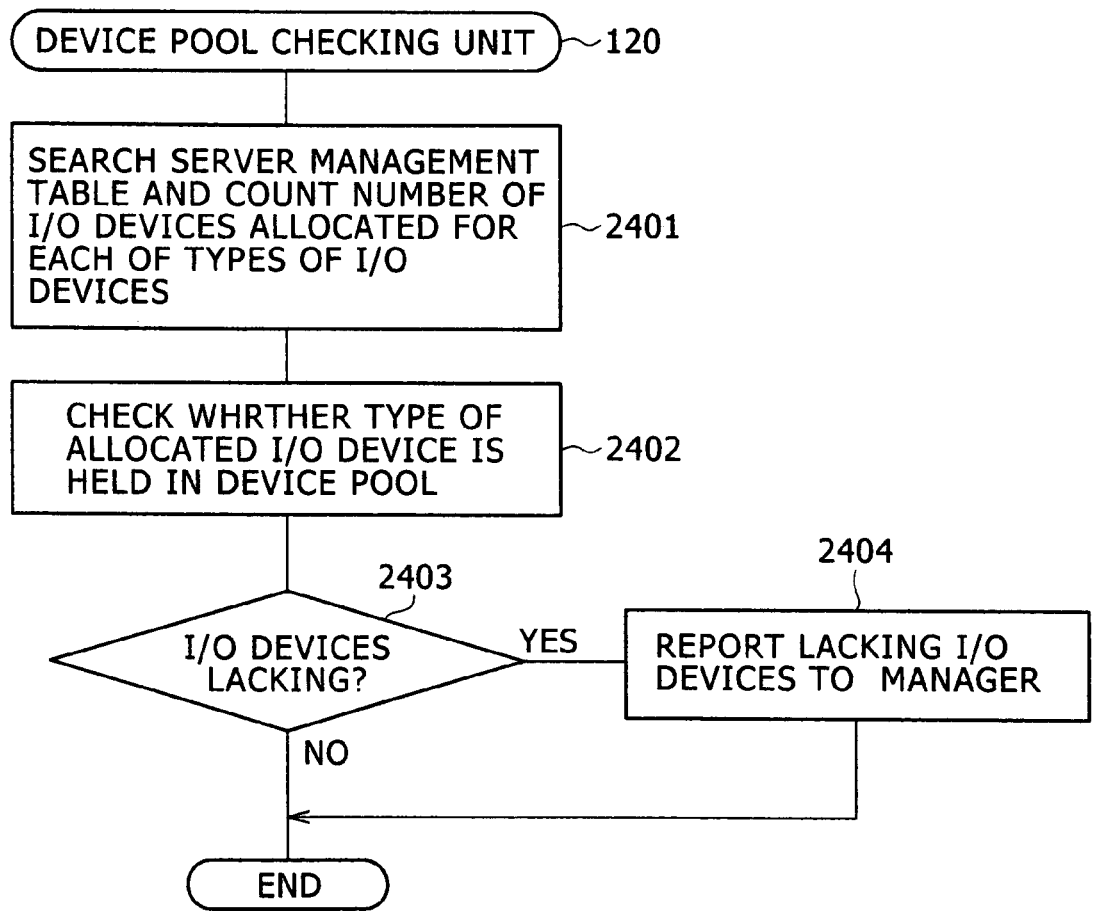
FIG. 24 is a drawing showing a flowchart of a device pool checking unit 120 in one embodiment.

FIG. 24 shows a processing flow of the device pool checking unit 120.

The device pool checking unit 120 searches the server management table 109 and count the number of I/O devices allocated for each of the types of I/O devices 117 (S2401). It checks whether at least one of the types of I/O devices 117 already allocated to the server device 114 is allocated in a device pool (S2402). When it is determined from the checking that a sufficient number of I/O devices 117 are not allocated in the device pool, it proceeds to S2404 to report lacking I/O devices to the manager (S2404). By executing such a processing flow when the configuration of I/O devices 117 is changed, the manager can previously recognize I/O devices 117 lacking in the device pool, and take countermeasures against it.

What is claimed is:

1. In a computer system in which a plurality of computers are connected to a plurality of I/O devices for connecting with external devices via one or a plurality of I/O switches, an I/O device switching method of allocating one or plurality of arbitrary I/O devices to the computers and changing the allocation, wherein:

an I/O device management table that manages a plurality of types of I/O devices connectable to the I/O switches is provided, one or plurality of I/O devices not allocated to the computers are defined and registered as standby I/O devices in the I/O device management table, and when a failure occurs in any one of the I/O devices, the I/O device management table is consulted to select I/O device of the same type as the I/O device in which the failure has occurred, from among the standby I/O devices, and allocate it to a computer to which the I/O device in which the failure has occurred is connected, an I/O switch management table, corresponding to an I/O switch identifier specific to each of the I/O switches, is provided in a management server for managing a port number of an I/O switch, information indicating the type of a device connected to a port, a device identifier specific to each of the I/O devices, and information indicating a state of an I/O device, the management server consults the I/O switch management table to acquire the device identifier of an I/O device in which a failure has occurred, and allocates an I/O device selected in an I/O device selecting unit to a computer to which an I/O device in which a failure has occurred, and when the I/O device management table, corresponding to the identifier of an I/O switch, registers and manages a port number, and information indicating an allocation state of an I/O device, the management server changes an allocation state of an I/O device.

2. The I/O device switching method of claim 1, wherein the I/O device management table holds an identifier specific to the I/O devices, the identifier of the I/O device in which the failure has occurred is acquired from the I/O device management table, and the identifier of the selected I/O device is rewritten to the identifier of the I/O device in which the failure has occurred.

3. The I/O device switching method of claim 2, wherein a program for rewriting the identifier is transferred to the computer allocated to the I/O device in which the failure has occurred, to rewrite the identifier.

4. The I/O device switching method of claim 1,
wherein the I/O switches have a function to convert port numbers to which the I/O devices are connected, into any port numbers in the computers, and when the I/O devices fail, converts the port number to which the selected I/O device is connected, into the port number to which the I/O device in which the failure has occurred is connected.

5. The I/O device switching method of claim 1,
wherein standby I/O devices are provided for each of the I/O switches, and when the I/O devices fail, an I/O device for replacement is selected from among more standby I/O devices of each of the I/O switches.

6. The I/O device switching method of claim 1,
wherein standby I/O devices are provided for each of the I/O switches, and when the I/O devices fail, an I/O device for replacement is selected from among standby I/O devices provided for less loaded I/O switches.

7. The I/O device switching method of claim 1,
wherein, when the computers are made highly reliable using the plurality of I/O devices of the same type, standby I/O devices are provided for each of the I/O switches, and when the I/O devices fail, an I/O device for replacement is selected from among standby I/O devices provided for the I/O switch to which the I/O device in which the failure has occurred is connected.

8. The I/O device switching method of claim 1,
wherein the types of the I/O devices allocated to the computers are compared with the types of the standby I/O devices, and when the number of the types of the standby I/O devices is smaller than the number of the types of the I/O devices allocated to the computers, a manager is notified that the standby I/O devices are lacking.

9. A computer system comprising:
a plurality of computers;
one or a plurality of I/O switches connected to the plurality of computers;
a plurality of I/O devices, connected to the I/O switches, for connecting with external devices; and
a management server, connected to the plurality of computers via a network, that monitors states of the computers and the I/O devices and changes the allocation of one or plurality of I/O devices connected to the computers, wherein:

the management server includes: an I/O device management table that defines and manages, as standby I/O devices, one or a plurality of I/O devices of a plurality of types of I/O devices connectable to the I/O switches that are not allocated to the computers; a failure detecting unit that detects failures occurring in at least two or more of the I/O devices; an I/O device selecting unit that, when a failure is detected in the failure detecting unit, consults the I/O device management table to select an I/O device of the same type as the I/O device in which the failure has occurred; and an I/O device switching unit that switches the I/O device in which a failure has occurred to an I/O device selected by the I/O device selecting unit, and connects a newly switched I/O device to the computer via the I/O switches, the management server further includes an I/O switch management table that, corresponding to an I/O switch identifier specific to each of the I/O switches, manages a port number of an I/O switch, information indicating the type of a device connected to a port, a device identifier specific to each of the I/O devices, and information indicating a state of an I/O device, the management server consults the I/O switch management table to acquire the device identifier of an I/O device in which a failure has occurred, and allocates an I/O device selected in an I/O device selecting unit to a computer to which an I/O device in which a failure has occurred is allocated, and when the I/O device management table, corresponding to the identifier of an I/O switch, registers and manages a port number, and information indicating an allocation state of an I/O device, the management server changes an allocation state of an I/O device.

10. The computer system of claim 9,
wherein the I/O device management table holds identifiers specific to the I/O devices, and the computer system acquires the identifier of the I/O device in which the failure has occurred, from the I/O device management table, and rewrites the identifier of the selected I/O device to the identifier of the I/O device in which the failure has occurred.

* * * * *